United States Patent
Junker et al.

(10) Patent No.: US 10,895,646 B2
(45) Date of Patent: Jan. 19, 2021

(54) OUTLIER-TOLERANT NAVIGATION SATELLITE SYSTEM POSITIONING METHOD AND SYSTEM

(71) Applicant: Trimble Inc., Sunnyvale, CA (US)

(72) Inventors: Stefan Junker, Munich (DE); Markus Glocker, Munich (DE); Nicholas Charles Talbot, Ashburton (AU)

(73) Assignee: Trimble Inc., Sunnyvale, CA (US)

( * ) Notice: Subject to any disclaimer, the term of this patent is extended or adjusted under 35 U.S.C. 154(b) by 377 days.

(21) Appl. No.: 15/827,664

(22) Filed: Nov. 30, 2017

(65) Prior Publication Data
US 2018/0172838 A1  Jun. 21, 2018

(30) Foreign Application Priority Data
Dec. 19, 2016 (EP) .................................. 16204999

(51) Int. Cl.
*G01S 19/44* (2010.01)
*G01S 19/29* (2010.01)
(Continued)

(52) U.S. Cl.
CPC .............. *G01S 19/29* (2013.01); *G01S 19/40* (2013.01); *G01S 19/44* (2013.01); *G01S 19/42* (2013.01)

(58) Field of Classification Search
CPC .......... G01S 19/29; G01S 19/42; G01S 19/44; G01S 19/40
(Continued)

(56) References Cited

U.S. PATENT DOCUMENTS

| 8,031,110 B2 * | 10/2011 | Abou Ghaida | G01S 19/07 |
| | | | 342/357.23 |
| 8,374,783 B2 * | 2/2013 | Takac | A01B 79/005 |
| | | | 340/988 |

(Continued)

FOREIGN PATENT DOCUMENTS

WO       2011/034616 A2       3/2011

OTHER PUBLICATIONS

Baarda, W., "Statistical Concepts in Geodesy," Netherlands Geodetic Commission, Publications on Geodesy, New Series, vol. 2, No. 4. Computing Centre of the Delft Geodetic Institute, 1967, Delft, Netherlands, 74 pages.

(Continued)

*Primary Examiner* — Chuong P Nguyen
(74) *Attorney, Agent, or Firm* — Kilpatrick Townsend & Stockton LLP

(57) ABSTRACT

The invention relates to a method carried out by a navigation satellite system (NSS) receiver or a processing entity receiving data therefrom, for estimating parameters useful to determine a position. The NSS receiver observes NSS signals from NSS satellites. Two filters, called "robustifier" and "main estimator" respectively, both use state variables and compute the values thereof based on: NSS signals observed by the NSS receiver, and/or information derived therefrom. The robustifier identifies, within the input data, measurements that do not match a stochastic model assigned thereto. For each identified measurement, the robustifier rejects the measurement, adjusts the stochastic model assigned to the measurement, and/or corrects the measurement. The robustifier uses fewer state variables than the main estimator. A corresponding system is also disclosed.

17 Claims, 6 Drawing Sheets

(51) Int. Cl.
*G01S 19/40* (2010.01)
*G01S 19/42* (2010.01)

(58) Field of Classification Search
USPC ............. 342/357.27, 357.25, 357.68, 357.23
See application file for complete search history.

(56) References Cited

U.S. PATENT DOCUMENTS

| | | | | |
|---|---|---|---|---|
| 8,760,343 | B2* | 6/2014 | Milyutin | G01S 19/20 |
| | | | | 342/357.27 |
| 9,157,999 | B2* | 10/2015 | Leandro | G01S 19/04 |
| 9,562,975 | B2* | 2/2017 | Vollath | G01S 19/25 |
| 9,599,721 | B2* | 3/2017 | Dai | G01S 19/235 |
| 9,891,325 | B2* | 2/2018 | Milyutin | G01S 19/20 |
| 10,254,412 | B2* | 4/2019 | Navarro Madrid | G01S 19/39 |
| 10,670,734 | B2* | 6/2020 | Glocker | G01S 19/44 |
| 2011/0122022 | A1 | 5/2011 | Van Den Bossche et al. | |
| 2015/0153460 | A1* | 6/2015 | Fleming | G01C 21/165 |
| | | | | 702/150 |
| 2018/0074210 | A1* | 3/2018 | Glocker | G01S 19/42 |
| 2019/0196024 | A1* | 6/2019 | Chen | G01S 19/29 |

OTHER PUBLICATIONS

Carosio, A. et al., "The Robust Statistics Method Applied to the Kalman Filter: Theory and Application," Proceedings of the 18th International Technical Meeting of the Satellite Division of the Institute of Navigation (ION GNSS 2005), Long Beach, CA, Sep. 16, 2005, pp. 525-535.

Chang, X-W, et al., "Huber's M-estimation in GPS Positioning: Computational Aspects." Proceedings of ION NTM. Jan. 26-28, 2004, San Diego, CA; (available from http://www.cs.mcgill.ca/~chang/pub/huber.pdf), pp. 829-839.

European Patent Office's (EPO) Extended European Search Report for Application No. 16204999.3-1812 issued under cover letter of Jun. 30, 2017, 6 pages.

Huber, P. J., "Robust Estimation of a location Parameter," 1964, University of California, Berkeley, The Annals of Mathematical Statistics, 35, pp. 73-101.

Huber, P. J., "Robust Statistics," John Wiley & Sons Inc., 1981, New York, 317 pages.

Salzmann, M. A., et al., "Quality Control in Kinematic Data Processing," Presented at the Second International Symposium on Land Vehicle Navigation, Jul. 4-7, 1989, DCON, Verlag TÜV, Rheinland, Köln, pp. 355-366.

Schick, I., et al. "Robust Recursive Estimation in the Presence of Heavy-Tailed Observation Noise." The Annals of Statistics (1994), vol. 22, No. 2, pp. 1045-1080.

Wicki, F., "Robuste Schatzverfahren für die Parameterschätzung in geodätischen Netzen." Nov. 1998, Mitteilungen Nr. 67, Institute of Geodesy and Photogrammetry, ETH Zürich, Switzerland, 186 pages.

Wübbena, G., et al., "State Space Approach for Precise Real Time Positioning in GPS Reference Networks." In Proceedings Int. Symp. on Kinematic Systems in Geodesy, Geomatics and Navigation (KIS2001), 8 pages.

Maronna, R. et al., "Robust Statistics, Theory and Methods," Wiley Series in Probability and Statistics, Copyright 2006, John Wiley & Sons Ltd., The Atrium, Southern Gate, Chichester, West Sussex PO19 8SQ, England; Section 1.1, 7 pages total.

Seeber, G., "Satellite Geodesy" $2^{nd}$ Edition, Copyright 2003, Walter de Gruyter, Berlin, Section 7, pp. 342-343, 6 pages total.

* cited by examiner

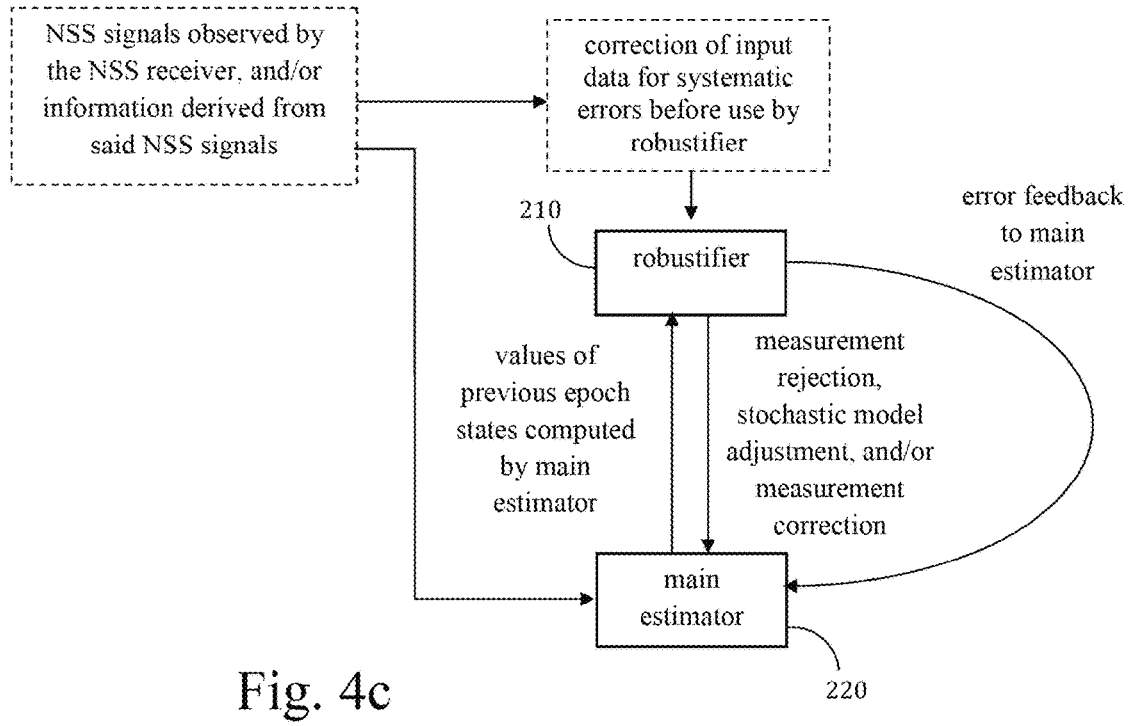
Fig. 4c
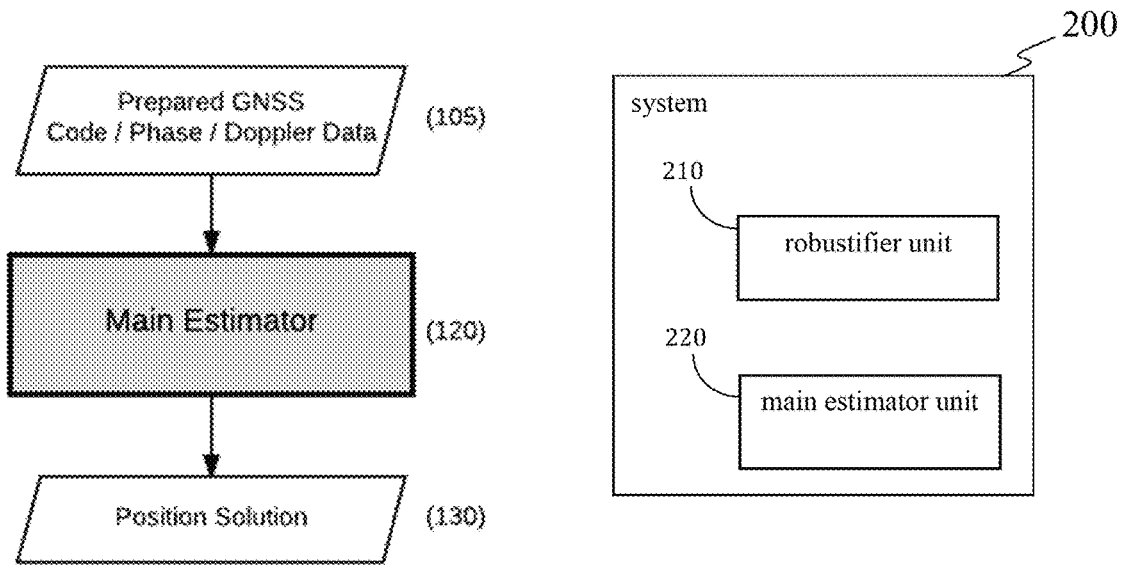
Fig. 5
Fig. 8

OUTLIER-TOLERANT NAVIGATION SATELLITE SYSTEM POSITIONING METHOD AND SYSTEM

CROSS REFERENCE TO RELATED APPLICATIONS

The present application claims priority to European Application No. 16204999.3, filed Dec. 19, 2016, the contents of which are incorporated herein by reference in their entirety for all purposes.

FIELD OF TECHNOLOGY

The invention relates to global or regional navigation satellite systems (NSS) position estimation methods, systems and computer programs. The fields of application of the methods, devices and computer programs include, but are not limited to, navigation, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BeiDou (China), QZSS (Japan), and the Indian Regional Navigational Satellite System (IRNSS) (systems in use or in development). A NSS typically uses a plurality of satellites orbiting the Earth. The plurality of satellites forms a constellation of satellites. A NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person will recognize that the same or similar principles apply to RNSS systems.

The main GNSS observables are therefore the carrier phase and code (pseudorange), the former being much more precise than the latter, but ambiguous. These observables enable a user to obtain the geometric distance from the receiver to the satellite. With known satellite position and satellite clock error, the receiver position can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequency is modulated with a pseudo-random number (PRN) code, and with satellite navigation data. Two different PRN codes are transmitted by each satellite: a C/A code and a P code which is encrypted for DoD-authorized users. Each C/A code is a unique sequence of 1023 bits, which is repeated each millisecond. Other NSS systems also have satellites transmitting multiple signals on multiple carrier frequencies.

There is a constant need for improving positioning systems based on GNSS (or RNSS) measurements, to obtain a precise estimation of the receiver position, and in particular to quickly obtain a precise estimation, so as to increase the productivity of positioning systems, with in mind the need to provide practicable systems.

SUMMARY

The present invention aims at addressing, at least partially, the above-mentioned need. The invention includes methods, systems, and computer programs as defined in the independent claims. Particular embodiments are defined in the dependent claims.

In one embodiment, a method is carried out by a NSS receiver, a processing entity capable of receiving data from the NSS receiver, or by both a NSS receiver and a processing entity capable of receiving data from the NSS receiver. The method's aim is to estimate parameters useful to determine a position. The NSS receiver observes a NSS signal from each of a plurality of NSS satellites over multiple epochs. The method comprises receiving input data, wherein the input data comprises: NSS signals observed by the NSS receiver, information derived from said NSS signals, or both NSS signals observed by the NSS receiver and information derived therefrom. The method also comprises operating a first filter, here referred to as "robustifier", and a second filter, here referred to as "main estimator". Each of the robustifier and main estimator uses state variables, and computes the values of their respective state variables at least based on the received input data. Furthermore, the robustifier identifies, within the received input data, any measurement that does not match a stochastic model assigned thereto. For each measurement identified by the robustifier as not matching its stochastic model, at least one of the following operations is carried out: (i) the robustifier rejects the measurement, and the main estimator does not use the rejected measurement; (ii) the robustifier adjusts the stochastic model assigned to the measurement, and the main estimator uses the adjusted stochastic model; and (iii) the robustifier corrects the measurement, and the main estimator uses the corrected measurement. In addition, the robustifier uses fewer state variables than the main estimator.

The method generally enables the provision of a precise position estimation even in the presence of measurements containing one or more outliers (i.e., unusually large errors). The method does so in a practicable manner, with a relatively low computational burden, by means of a robustifier that implements a robust statistical method and wherein the robustifier uses fewer state variables than the main estimator.

The invention also relates, in one embodiment, to a system comprising a NSS receiver, a processing entity capable of receiving data from the NSS receiver, or both a NSS receiver and a processing entity capable of receiving data therefrom. The system aims at estimating parameters useful to determine a position. The NSS receiver is configured to observe a NSS signal from each of a plurality of NSS satellites over multiple epochs. The system is configured for receiving input data, wherein the input data comprises: NSS signals observed by the NSS receiver, information derived from said NSS signals, or both NSS signals observed by the NSS receiver and information derived therefrom. The system is configured to operate a first filter, here referred to as "robustifier", and a second filter, here referred to as "main estimator". The robustifier and main estimator are so that, in operation, each of them uses state variables and computes the values of their respective state variables at least based on the received input data. Furthermore, the robustifier is so that, in operation, it identifies, within the received input data, any measurement that does not match a stochastic model assigned thereto, and, for each measurement identified by the robustifier as not matching its stochastic model, at least one of the following operations is carried out: (i) the robustifier rejects the measurement, and the main estimator does not use the rejected measurement; (ii) the robustifier adjusts the stochastic model assigned to the measurement, and the main estimator uses the adjusted stochastic model; and (iii) the robustifier corrects the measurement, and the main estimator uses the corrected measurement. In addition, as mentioned above, the robustifier uses, in operation, fewer state variables than the main estimator.

The invention also relates, in some embodiments, to computer programs, computer program products, and storage mediums for storing such computer programs, comprising computer-executable instructions for carrying out, when executed on a computer such as one embedded in a NSS receiver or in another apparatus, the above-described method.

BRIEF DESCRIPTION OF THE DRAWINGS

Embodiments of the present invention shall now be described, in conjunction with the appended drawings in which:

FIGS. 2, 3a, 3b, 4a, 4b, and 4c schematically illustrate the architecture of methods in six embodiments of the invention, which may be regarded as six exemplary ways of implementing the method described with reference to FIG. 1;

FIG. 5 schematically illustrates a generic GNSS data processing architecture, in order to illustrate the context in which some embodiments of the invention have been developed;

FIG. 8 schematically illustrates a system in one embodiment of the invention.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive. A list of abbreviations and their meaning is provided at the end of the detailed description.

Throughout the following detailed description, the abbreviation "GNSS" is sometimes used. The invention is, however, not limited to global navigation satellite systems (GNSS) but also applies to regional navigation satellite systems (RNSS). Thus, it is to be understood that each occurrence of "GNSS" in the following can be replaced by "RNSS" to form additional embodiments.

When the term "real-time" is used in the present document, it means that there is an action (e.g., data is processed, results are computed) as soon as the required information for that action is available. Thus, certain latency may exist, which depends on various aspects depending on the involved component(s) of the system.

Figure 1:
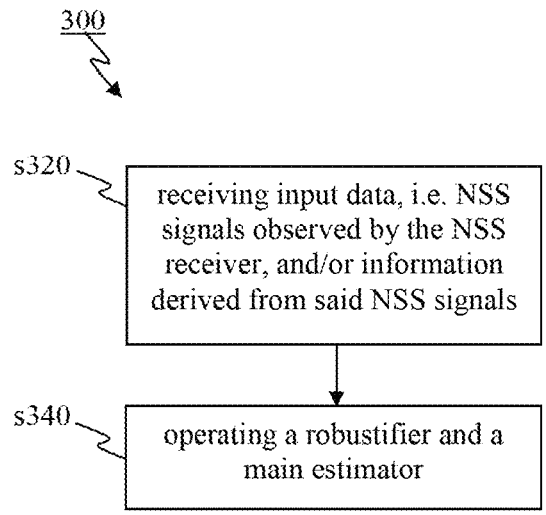
FIG. 1 is a flowchart of a method in one embodiment of the invention.

FIG. 1 is a flowchart of a method 300 in one embodiment of the invention. Method 300 is carried out by a NSS receiver and/or a processing entity capable of receiving data from the NSS receiver. This means that embodiments of the invention may be carried out (a) in a NSS receiver, for example through the real-time processing of GNSS data, (b) in another processing entity, for example for off-line, post-mission processing purposes, or (c) in both a NSS receiver and another processing entity.

The purpose of the method is to estimate parameters useful to determine a position, such as for example the position of the NSS receiver.

The estimated parameters may for example indicate the most probable number of carrier cycles along the distance separating a NSS satellite from the NSS receiver, i.e. the estimated parameters may be the resolved integer ambiguity. This also means that the method may output the position itself but not necessarily: parameters may be output that may then be used, for example by another entity (such as a processing entity on a server dedicated to such task), to estimate or determine the position of the NSS receiver (i.e., the rover position) or of a reference station. Furthermore, other parameters such as, for example, properties of the ionosphere may be output. Indeed, if the position of both the NSS receiver and a plurality of NSS satellites are known, resolving the integer ambiguities may enable the determination of parameters affecting the transmission of the signals (or some components thereof) through the ionosphere or other parts of the atmosphere. Yet furthermore, beyond determining the position of a rover or a reference station, if the position of NSS receivers (such as reference stations) is known, solving the integer ambiguities in the carrier phases by solving observation equations may also be used to eventually determine the position of a satellite.

The NSS receiver observes a NSS signal from each of a plurality of NSS satellites over multiple epochs. Each of these epochs is here referred to as "receiver epoch". The observed NSS signal may for example be a GPS signal (such as for example the L1 or L2 signal), a GLONASS signal, a Galileo signal, a BeiDou signal, a QZSS signal, or an IRNSS signal. If a given NSS satellite emits more than one NSS signal, the NSS receiver may observe more than one NSS signal from said satellite. Furthermore, the NSS receiver may observe NSS signals from a single NSS or, alternatively, from a plurality of different NSS.

Method 300 comprises receiving s320 input data comprising: NSS signals observed by the NSS receiver, information derived from said NSS signals, or both.

The received input data may for example comprise correction information obtained by a network of reference stations. The correction information may comprise correction data relating to NSS satellites, such as, but not limited to, accurate orbital data and accurate satellite clock data. The correction information may be computed or prepared by a network of reference receivers with precisely known positions in a global reference frame (i.e., coordinate system). Typically a world-wide network of reference receivers is used for GNSS systems, whereas a regional network of reference receivers is typically sufficient for RNSS systems. The network of receivers used for GNSS systems may be combined with the network of receivers used for RNSS systems using the same global reference frame. The data from the reference receivers is transmitted for example over the internet to a processing centre, where the data is collected, synchronized and processed. During the data processing, a variety of products can be generated, including e.g. satellite orbits, satellite clock errors, GNSS (or RNSS) measurement biases, and atmospheric effects. The products (or corrections) may then be sent to the NSS receivers (i.e., the rovers) on the field. The transmission to the NSS receivers may take place in many different forms, of which the most commonly used are the internet and satellite links. For a descriptive example of a global GNSS positioning correction service see e.g. WO 2011/034616 A2.

Method 300 further comprises operating s340 a first filter, referred to as "robustifier", and a second filter, referred to as "main estimator". (Robustifier and main estimator, which are not distinctly depicted in FIG. 1, are referred to respectively as elements "210" and "220" in other drawings such as for example in FIGS. 2, 3, 4a, 4b and 4c. Thus, for the sake of consistency, reference numerals 210 and 220 are from now on associated with robustifier and main estimator.) In that context, a filter is or comprises an algorithm or process, or a piece of software and/or hardware configured for implementing such an algorithm or process, in which a set of state variables (or "state vector") are maintained over time, i.e. the values of the state variables are estimated based on a series of measurements made over time.

Thus, robustifier 210 and main estimator 220 use state variables. In one embodiment, the values of each of the state variables in each of the two filters are computed at each receiver epoch. In particular, in one embodiment, robustifier 210 computes values of each of its state variables at each receiver epoch prior to main estimator 220.

Furthermore, robustifier 210 uses fewer state variables than main estimator 220. In the following, the state variables that are used by robustifier 210 are referred to as "robustifier-designated state variables". There are R robustifier-designated state variables, wherein R is a positive integer (i.e., $R \geq 1$). Main estimator 220 uses M state variables, wherein M is a positive integer (i.e., $M \geq 1$) and $M > R$. In one embodiment, all R robustifier-designated state variables are also used by main estimator 220, although the values of these common state variables are generally computed and maintained separately in robustifier 210 and main estimator 220 respectively.

Each of robustifier 210 and main estimator 220 computes the respective values of their state variables at least based on the received input data, i.e. based on NSS signals observed by the NSS receiver, and/or based on information derived from said NSS signals. In one embodiment, each of robustifier 210 and main estimator 220 computes the respective values of their state variables based on carrier phase measurements generated from the NSS signals observed by the NSS receiver.

Robustifier 210 may comprise, for example, an M-estimator (see for example reference [2], section 2.2), a BIBER estimator (see reference [10]), a least median squares (LMS) estimator (see for example reference [2], section 5.6), a least trimmed squares (LTS) estimator (see for example reference [2], section 5.6.2), a S-estimator (see for example reference [2], section 5.6.1), a L1 estimator (see for example reference [2], sections 4.1 and 4.4), or a combination of any of those. The invention is, however, not limited to the use of the above-mentioned robust estimation filter(s). Other robust estimation filters may be used. In one embodiment, robustifier 210 neither comprises a Kalman filter nor a least-squares estimator.

Main estimator 220 may comprise, for example, a Kalman filter, and/or a least squares estimator. In one embodiment, main estimator 220 comprises a Kalman filter. In another embodiment, main estimator 220 comprises a least squares estimator. The invention is, however, not limited to the use, in main estimator 220, of Kalman filter(s), and/or least squares estimator(s). Other filters may be used.

Robustifier 210 identifies, within the received input data, any measurement that does not match a stochastic model assigned thereto. Measurements comprised in the received input data may for example be assigned their stochastic model before robustifier 210 uses the received input data.

The stochastic model assigned to a measurement may for example be empirically derived based on a repository of NSS tracking environments. Alternatively, or additionally, the stochastic model may also be adaptively, i.e. dynamically, assigned to a measurement based on real-time metrics. For example, a set of stochastic models may be used for a given NSS receiver and/or antenna type, and then, additionally, the stochastic models may be dynamically adjusted based on various metrics, such as: (1) signal-to-noise ratio generated by the NSS receiver, (2) predefined model, such as e.g. an elevation-based model, with a set noise model in zenith, (3) real-time filtering, such as e.g. smoothing the signal and comparing the measurement against the smoothed one. Other metrics may be used as well.

A measurement is generally found not to match the stochastic model assigned thereto because the measurement is an outlier. An outlier may for example be present as a result of: a) signal obstruction, distortions and diffractions resulting from foliage, solid structures, or the like; b) signal multipath; c) ionospheric scintillations; d) a cycle slip that has not been detected and repaired (i.e., corrected) by the NSS receiver prior to inputting the measurements into robustifier 210 and main estimator 220 (see for example reference [1], section 7.1.2, regarding the concepts of cycle slip detection and repair); e) wrong integer ambiguities, if the received input data comprises carrier phase measurements derived from the NSS signals observed by the NSS receiver; or f) incorrect correction information (obtained from a network of reference stations), such as for example jump or drift in satellite clock error correction or satellite orbit estimation.

Then, for each measurement identified by robustifier 210 as not matching its stochastic model, at least one among the following operations is carried out:
  (1) operation (i): robustifier 210 rejects the measurement, and main estimator 220 does not use the rejected measurement;
  (2) operation (ii): robustifier 210 adjusts the stochastic model assigned to the measurement, and main estimator 220 uses the adjusted stochastic model for the measurement; and
  (3) operation (iii): robustifier 210 corrects the measurement, and main estimator 220 uses the corrected measurement.

In one embodiment, the step of identifying, within the received input data, any measurement that does not match a stochastic model assigned thereto, and operations (i), (ii), and/or (iii) are performed at each receiver epoch.

Rejecting a measurement (operation (i)) may be for example achieved by flagging the measurement as rejected and transmitting this information to main estimator 220. This is, however, only one possible way to reject a measurement. Adjusting the stochastic model assigned to a measurement (operation (ii)) may, in some cases, have the same effect or almost the same effect as a measurement rejection, and therefore may be regarded as a form of a measurement rejection (operation (i)). For example, the assignment of an infinite variance to a measurement has the same effect as a measurement rejection.

The purpose of adjusting, in operation (ii), the stochastic model assigned to a measurement is to deweight the measurement, i.e. to reduce the weighting it has on the main estimator processing. This may be further explained as follows: Typically, GNSS code and phase measurements are assumed to have stochastic models that can be satisfactorily approximated by a first-order Gauss-Markov stochastic process, plus a Gaussian white noise component (see e.g. reference [1], p. 239). The Gauss-Markov parameters are included as nuisance terms in the main estimator state vector. The variance of the Gaussian white noise component is assigned to each measurement when input to main estimator 220. Therefore, the adjustment of the stochastic model assigned to a measurement (operation (ii)) by deweighting the measurement may involve one of the two following steps, or both of them:
  (1) adjustment of the correlated variance and/or correlation time of the respective GM1 parameter in the main estimator state vector (wherein GM1 is the Gauss-Markov parameter). This affects the time update of the state.
  (2) adjustment of the variance of the respective (code and/or phase) measurement applied to main estimator 220.

Correcting a measurement (operation (iii)) comprises modifying the measurement itself. That is, if robustifier 210 determines for example that there is a 100-meter error on a measurement (as a result of identifying that the measurement does not match a stochastic model assigned thereto), the respective measurement may be corrected by 100 meters before it is used within main estimator 220. Main estimator 220 then uses those measurements that have not been corrected as well as those that have been corrected by robustifier 210.

In one embodiment, robustifier 210 rejects any measurement identified as not matching its stochastic model, in accordance with operation (i) and without performing any of operations (ii) and (iii). In another embodiment, robustifier 210 adjusts the stochastic model assigned to any measurement identified as not matching its stochastic model, in accordance with operation (ii) and without performing any of operations (i) and (iii). In yet another embodiment, robustifier 210 corrects any measurement identified as not matching its stochastic model, in accordance with operation (iii) and without performing any of operations (i) and (ii).

Operations (i), (ii) and (iii) may, however, also be combined in some embodiments, i.e. a) combining operations (i) and (ii), b) combining operations (i) and (iii), c) combining operations (ii) and (iii), or d) combining operations (i), (ii) and (iii).

In one embodiment, depending on a criterion, robustifier 210 either rejects a measurement identified as not matching its stochastic model (operation (i)), or adjusts its stochastic model (operation (ii)). The criterion may for example involve two thresholds, such as a "lower threshold" and an "upper threshold". The following rules may for example be used:
  (1) If |residual|<lower threshold
      then accept measurement as "good";
  (2) If |residual|≥lower threshold and |residual|<upper threshold
      then adjust stochastic model;
  (3) If |residual|≥upper threshold
      then reject measurement.

The residual is the difference between the measurement and the estimated value (e.g., the sample mean) of the state variable.

In one embodiment, depending on a criterion, robustifier 210 either rejects a measurement identified as not matching its stochastic model (operation (i)), or corrects the measurement (operation (iii)). The criterion may for example again involve two thresholds, such as a "lower threshold" and an "upper threshold". The following rules may for example be used:
  (1) If |residual|<lower threshold
      then accept measurement as "good";
  (2) If |residual|≥lower threshold and |residual|<upper threshold
      then correct measurement so that |residual|<lower threshold;

(3) If |residual|≥upper threshold
   then reject measurement.

In one embodiment, depending on a criterion, robustifier 210 either rejects a measurement identified as not matching its stochastic model (operation (i)), or corrects the measurement and also adjusts its stochastic model (operations (ii) and (iii)). The criterion may for example again involve two thresholds. The following rules may for example be used:

(1) If |residual|<lower threshold
   then accept measurement as "good";
(2) If |residual|≥lower threshold and |residual|<upper threshold
   then correct measurement so that |residual|<lower threshold and adjust the stochastic model;
(3) If |residual|≥upper threshold
   then reject measurement.

Robustifier 210 operating as a pre-processing step before main estimator 220 effectively enables the detection of outliers in the input data. The presence of these measurement outliers is then addressed by rejecting the outlier (operation (i)), adjusting the stochastic model assigned to the measurement (operation (ii)), and/or correcting the measurement of concern (operation (iii)). In such a manner, main estimator 220 generally produces more accurate results, i.e. a more accurate position solution. For example, in embodiments in which operation (ii) is performed, main estimator 220 produces more accurate results benefiting from the adjusted stochastic model, since "bad" measurements are deweighted by the adjustment of the stochastic model.

Furthermore, the computational burden is also relatively low because robustifier 210 uses fewer state variables than main estimator 220. In other words, the method's robust estimation pre-filtering step uses a reduced set of state variables compared to main estimator 220. Comparatively, integrating the robust estimation within main estimator 220, or, alternatively, using the same number of state variables in the robustifier 210 and main estimator 220, would lead to a much higher computational burden, to the point that such solutions may not be practicable at all, especially in a portable NSS receiver. Matrix computations are indeed much faster when using fewer state variables. For example, the computational effort in a Kalman filter implementation is typically proportional to the square of the number of state variables.

In one embodiment, in addition to obtaining information from robustifier 210 about rejected measurements (operation (i)), adjusted stochastic models (operation (ii)), and/or corrected measurements (operation (iii)), main estimator 220 may also obtain from robustifier 210 initial estimates for some state variables, such as for example position state variables. This embodiment may be advantageous at least for the following reason: In order to use a Kalman filter in main estimator 220, the problem has to be linearized. A better linearization point typically provides a better solution. The problem may be linearized around the result provided by robustifier 210.

Method 300 may for example output a position solution (or navigation solution) provided by main estimator 220, including parameters to determine a position, or estimated errors that may be used by (an)other filter(s), unit(s) or entity(ies) to determine a position.

As mentioned above, robustifier 210 uses fewer state variables than main estimator 220. In other words, R (the number of robustifier-designated state variables) is smaller than M (the number of state variables used by main estimator 220), i.e. R<M. In one embodiment, R≤0.5×M, i.e. R is smaller than half the value of M. In other embodiments, R≤0.25×M; R≤0.1×M; and/or R≤0.05×M.

In one embodiment, the robustifier-designated state variables are chosen among the available state variables by virtue of the extent to which their values are expected to change compared to the previous epoch. The state variables with relatively large expected changes may for example be chosen as robustifier-designated state variables.

In one embodiment, robustifier 210 uses at least the following state variables:
(1) three state variables representing at least one of:
   a. the position of the NSS receiver,
   b. an offset in the position of the NSS receiver relative to another position, and
   c. a change in the position of the NSS receiver; and
(2) a state variable representing at least one of:
   a. a NSS common bias term for at least one NSS,
   b. an offset in said NSS common bias term relative to another NSS
   c. a change in a NSS common bias.

In one embodiment, robustifier 210 uses only four state variables, namely the three above-mentioned state variables (1) (which represent at least one of: the position of the NSS receiver, an offset in the position of the NSS receiver relative to another position, and a change in the position of the NSS receiver) and the above-mentioned fourth state variable (2) (which represents at least one of: a NSS common bias term for at least one NSS, an offset in said NSS common bias term relative to another NSS common bias term, and a change in a NSS common bias).

The NSS common bias may for example be the NSS receiver clock bias.

In one embodiment, robustifier 210 additionally uses further state variable(s) such as state variable(s) representing the velocity and/or acceleration of the NSS receiver.

Robustifier 210 may be implemented in different ways to identify, within the received input data, any measurement that does not match the stochastic model assigned thereto. Two possible embodiments are presented with reference to FIGS. 2 and 3a respectively, namely a code analysis embodiment and a residual analysis embodiment.

a) "Code Analysis" Embodiment

Figure 2:
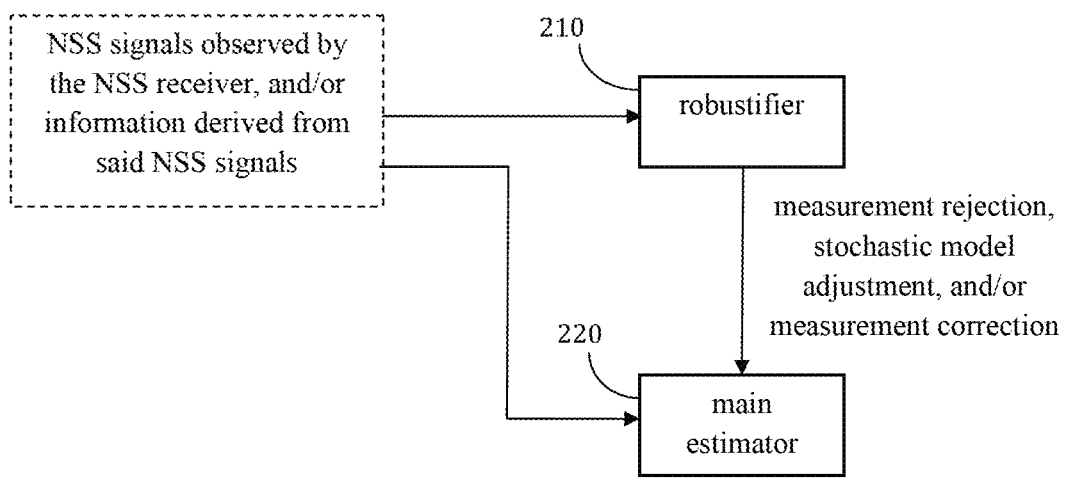

In that embodiment, schematically illustrated by FIG. 2, robustifier 210 operates as a standalone estimator. The outlier detection is applied in a two-step approach: First, observations (i.e., measurements) are fed into the filter (as illustrated by the arrow reaching box 210 in FIG. 2) and robustifier 210 produces position error estimates (i.e., estimates of the error compared to the true position) as well as measurement quality information. The magnitude of the residuals provides an indication of the quality of the measurements. If a sufficient number of measurements are available, measurements producing large residuals can generally be said to be of worse quality than those producing small residuals. The measurements introduced into robustifier 210 may be corrected for systematic errors such as for example atmospheric delays or satellite clock errors, for example by using data obtained from a reference station or a correction service. The remaining errors in the measurements (e.g. because the reference data does not remove the errors completely) are assumed to be small enough not to disturb the outlier detection performed by robustifier 210. In a second step, the measurement quality information computed by robustifier 210 is used to adjust the stochastic model per measurement (operation (ii)). The corrected stochastic model is then fed into main estimator 220 (as illustrated by the arrow from box 210 to box 220 in FIG. 2), so as to minimize the influence of the detected outliers on the main estimator processing.

b) "Phase Analysis" Embodiment

Figure 3A:
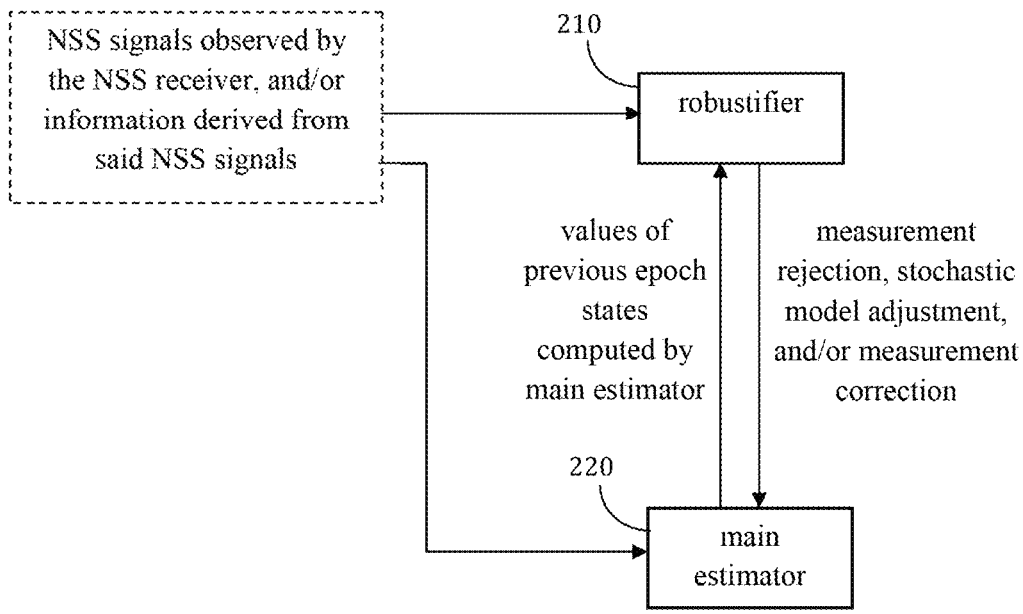

In that embodiment, schematically illustrated by FIG. 3a, robustifier 210 receives data from main estimator 220. In a first step, robustifier 210 computes a priori residuals (before the main estimator observation update) with observations (i.e., measurements) of the current epoch (as illustrated by the horizontal arrow reaching box 210 in FIG. 3a) and the main estimator state variable values of the previous epoch (as illustrated by the vertical arrow reaching box 210 in FIG. 3a). The a priori computed residuals may contain the following information:

NSS receiver position change between previous and current epoch: to be estimated (not time-dependent, large changes expected);

receiver clock change between previous and current epoch: to be estimated (time-dependent, large changes expected);

atmospheric changes between previous and current epoch: negligible (time-dependent, very small changes expected);

measurement noise (not time-dependent, but white noise expected), and possible outliers in the new measurements, because the main estimator state variable values are assumed to be correct: this is the target (not time-dependent and not predictable). If main estimator 220 were to incorrectly estimate one of its state variables, the error associated with this state variable would become part of the residual. In that case, the residual would contain information about outlier(s) as well as incorrectly estimated state variables. For the sake of simplicity, it is assumed here that the main estimator state variable values are correct.

This means that the a priori computed residuals represent measurements that have been corrected using information from the previous epoch. Main estimator 220 holds atmospheric information (ionosphere and troposphere state variables), which do not significantly change from one epoch to another (assuming a common time interval of 1 second or less). It is therefore unnecessary to estimate the values of these state variables in robustifier 210. Additionally, phase ambiguities are time-invariant under continuous phase tracking and therefore only change when cycle slips occur. The remaining state variables are therefore: position error, receiver clock error, measurement noise, and the outliers, which robustifier 210 detects and deweights. The last step is identical to the "code analysis" embodiment: the quality information is used to correct the stochastic model and the corrected stochastic model is fed into main estimator 220.

Figure 3B:
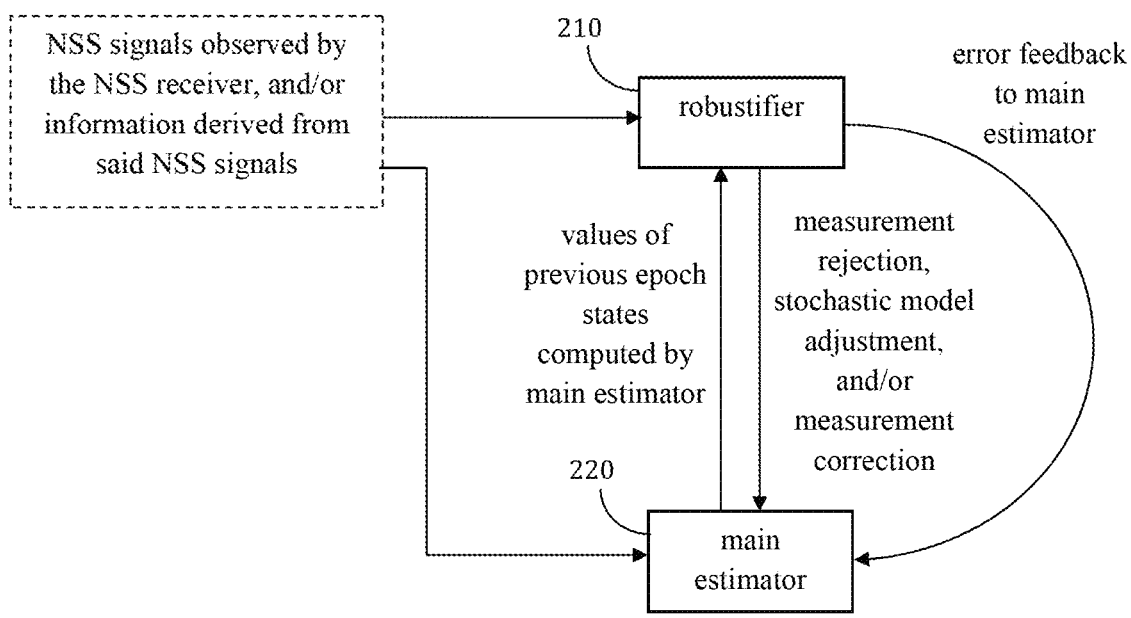

In one embodiment, as illustrated by FIG. 3b, robustifier 210 not only receives, from main estimator 220, values of state variables used by main estimator 220, but robustifier 210 also identifies error(s) within the received state variable values (for example error(s) in carrier phase ambiguities), and then provides feedback thereon to main estimator 220, so that main estimator 220 may take some corrective actions. In this embodiment, robustifier 210 is therefore used to detect, and potentially correct, suspect parameter estimates in main estimator 220. As in the embodiment illustrated with reference to FIG. 3a, there is feedback from main estimator 220 to robustifier 210, but additionally, if one or more of the state variable values in main estimator 220 are found to be incorrect (i.e., inconsistent with their formal precision), this potentially results in the robustifier 210 identifying a problem (state error detection).

For example, if one of the carrier phase ambiguity state variable values in main estimator 220 is in error by 10 cycles, and the formal precision of the respective carrier phase ambiguity is 0.0001 cycle, the corresponding phase measurement used in robustifier 210 is in error by about 10 cycles. Feedback of this error to main estimator 220 allows the main estimator 220 to correct the state variable value (state error repair), or to reset the state variable.

Figure 4A:
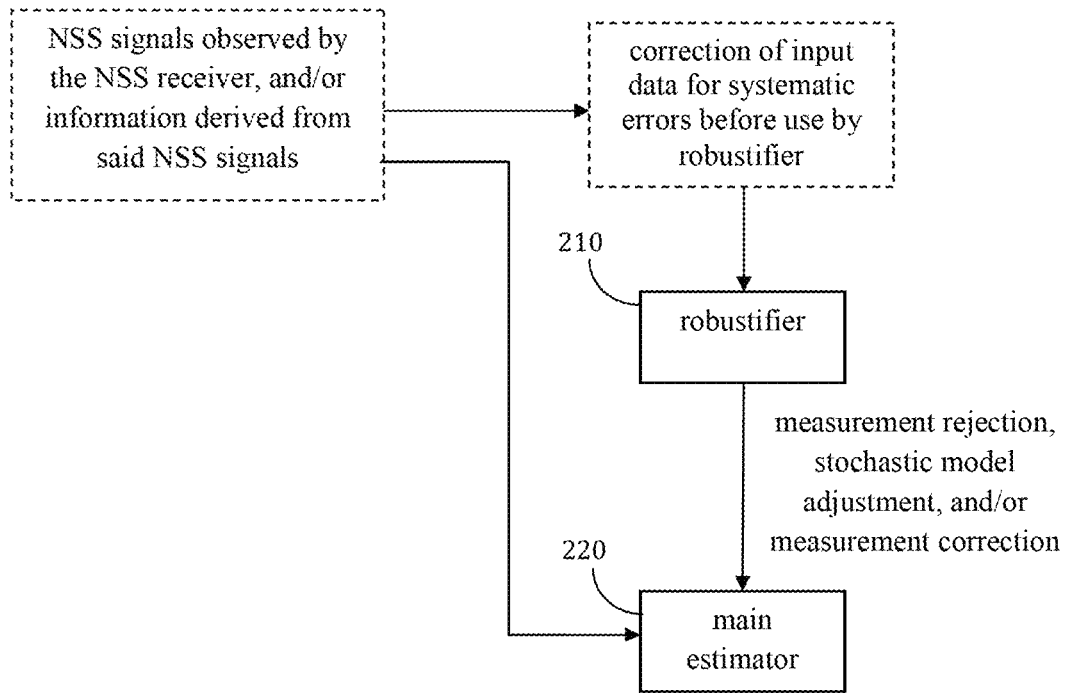
Figure 4B:
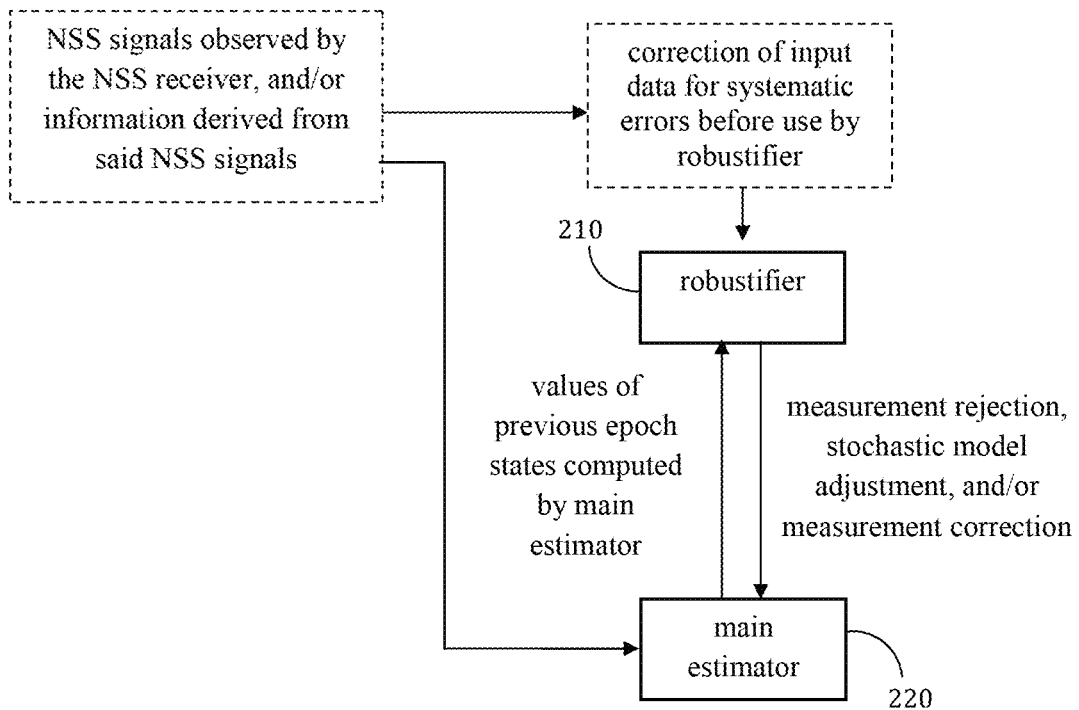

FIGS. 4a, 4b, and 4c schematically illustrate the architecture of methods in three embodiments of the invention, which differ from the embodiments illustrated with reference to FIGS. 2, 3a, and 3b, respectively, in that the received input data is corrected for systematic errors before robustifier 210 uses said received input data. A systematic error can generally be corrected using a model, lookup table or alike. For example, GNSS antennas have phase center variations which are elevation dependent. The antenna phase center errors are typically compensated for using a lookup table based on the antenna type and satellite elevation angle. Another systematic error is due to the troposphere. Most of the tropospheric error is accounted for using a well-known set of correction formulae. Systematic errors may therefore be corrected in the measurements before they are used by robustifier 210 and main estimator 220.

Before discussing further embodiments of the invention, let us now further explain, in sections A to C, the context in which some embodiments of the invention have been developed, for a better understanding thereof, as well as some technical considerations that may be helpful for understanding some embodiments of the invention and problems addressed by these embodiments.

A. GNSS Estimation

FIG. 5 schematically illustrates a conventional GNSS data processing scheme. A main estimator 120 accepts GNSS measurements 105 as input to produce a position solution 130. Suitable GNSS measurements 105 include code (pseudorange), carrier-phase and Doppler data collected by a GNSS receiver to a plurality of satellites, on one or more frequency bands per satellite. The GNSS measurements can be either single-receiver (rover only) or single-difference (rover—reference) data.

A component of the GNSS measurement data is their associated a priori stochastic models that describe their expected error distribution. Typically, GNSS measurements are assumed to follow a Gaussian distribution. However, experience has shown that, in many cases, outliers and systematic errors exist in GNSS code, carrier phase and Doppler data.

A function of the main estimator is to compute the parameters of interest, which typically include the instantaneous NSS receiver position, time, and optionally velocity and acceleration. For high-precision GNSS applications, adequately modelling certain errors affecting the measurements is important as it improves the precision and accuracy of the position-related parameters of interest. Often the main estimator includes the nuisance parameters listed in Table 1.

TABLE 1

Nuisance parameters estimated in GNSS positioning. The dependency describes how each parameter relates to a given receiver, tracked satellites and frequency bands.

| Nuisance parameter type | Dependency | Number of modeled parameters |
|---|---|---|
| Ionospheric biases | Receiver/Satellite | S |
| Tropospheric biases | Receiver | 1 |
| Carrier phase ambiguities | Receiver/Satellite/Frequency Band | S * F |
| Carrier phase multipath | Receiver/Satellite/Frequency Band | S * F |
| Code multipath | Receiver/Satellite/Frequency Band | S * F |
| Doppler multipath | Receiver/Satellite/Frequency Band | S * F |
| GLONASS frequency bias | Receiver | 1 |
| Carrier receiver hardware bias | Receiver/Frequency Band | F |
| Code receiver hardware bias | Receiver/Frequency Band | F |
| Receiver clock bias | Receiver/Satellite system | Y |

S = number of satellites;
F = number of frequency bands per satellite;
Y = number of satellite systems.

The parameters of interest and nuisance parameters are contained within the main estimator in a state vector x. The state vector is estimated using the input GNSS measurements via well-known techniques such as Kalman filtering or least squares estimation. Kalman filtering methods are designed to handle time-variant parameters and are particularly useful for GNSS estimation applications.

The dimension of the state vector x becomes large when the number of simultaneously tracked satellites is high and when rigorous nuisance parameters are modelled (see Table 1). As of 2016, there are more than 30 GNSS satellites in view (S≥30) in many parts of the world throughout the day. Furthermore, most GNSS satellites broadcast signals on two or more frequency bands (F=2).

Therefore, if the main estimator supports all satellites in view, the number of estimated parameters can be much larger than 100 for a rigorous nuisance parameter modelling scheme. The number of state parameters directly affects the computational complexity of the main estimator and therefore may prohibit operation on GNSS receiver hardware with limited computational power.

The rigour of the model can be relaxed if utmost accuracy is not required. For example, differential code-only processing produces meter-level accuracy without the need to model carrier phase ambiguities and carrier phase multipath parameters.

B. Measurement Outliers

Least-squares estimation and Kalman Filtering are based on the assumption that the measurements are subject to small errors which approximately follow a Gaussian distribution. This assumption leads to computational formulations with direct, non-iterative solutions for the estimated parameters. Unfortunately, GNSS measurements frequently contain large errors which do not follow a classical Gaussian distribution. Typically, the large errors are due to signal distortions and tracking errors caused by obstructions, signal reflections and interference between satellite and the receiving antenna.

Large measurement errors generally have a large unbounded and detrimental influence on the estimated parameters in Kalman filters and Least Squares Estimators. Outlier detection/rejection schemes have been developed around Kalman filtering and least squares estimation, in an attempt to deal with the problem of measurement outliers (see references [3], [4], [5]). However, many of the outlier detection techniques are only able to identify a single outlier, or are not computationally efficient.

C. Robust Estimation

Robust estimation techniques are modelled on the assumption that some of the measurement errors depart from a given distribution. The influence of one or more outliers on the estimated parameters is bounded by robust estimation methods. Much of the fundamental work on robust methods was undertaken in the 1960s (see references [6], [7]). The advent of assessable high-speed computing devices stimulated renewed development in robust estimation in the 1980s (see references [8], [9]).

One of the most common robust estimation techniques is the M-estimator, which can be described as follows. Given a general linear model that relates measurements to the parameters:

$$y = Ax + v \qquad (1)$$

where:
$y = [y_1, y_2, \ldots y_m]^T \epsilon R^m$ measurement vector,
$A = [a_1, a_2, \ldots a_m]^T \epsilon R^{m \times n}$ design matrix,
$x = [x_1, x_2, \ldots x_n]^T \epsilon R^n$ state parameter vector to be estimated,
$v = [v_1, v_2, \ldots v_m]^T \epsilon R^m$ random noise vector with $cov\{v\} = \sigma^2 I$, ($\sigma$ is assumed to be known).

For a given state vector x, the following residual vector is defined by:

$$r(x) \equiv y - Ax \qquad (2)$$

with the elements of the residual vector:

$$r(x) = [r_1, r_2 \ldots r_m]^T \epsilon R^m \qquad (3)$$

The M-estimate of the parameter vector is the solution of the optimization problem:

$$\min_x \{ F(x) \equiv \Sigma_{i=1}^m \rho(r_i(x)) \} \qquad (4)$$

where $\rho$ is a non-negative, convex, piecewise function defined by:

$$\rho(t) \equiv \begin{cases} \frac{1}{2} t^2, & |t| \leq \gamma \\ \gamma |t| - \frac{1}{2} \gamma^2 & |t| > \gamma \end{cases} \qquad (5)$$

The M-estimation process defined by equations (2) to (5) effectively minimizes the sum of the squares of all measurement residuals that fall within the bound defined by the tuning constant $\gamma > 0$. Importantly, any residual $r_i(x)$ that falls outside of the threshold $|r_i(x)| > \gamma$ has its influence on F(x) bounded.

The tuning constant $\gamma$ defines the threshold where measurements are accepted or treated as outliers. Typically, tuning constant $\gamma$ is set to be in the interval [1.5σ, 2.5σ]. If all residuals fall within the bound $|r_i(x)| \leq \gamma$, then it can be shown that the solution to equation (4) is equivalent to that produced by least squares estimation—this is one of the desirable characteristics of the Huber function $\rho(t)$. There are several other well-known functions that can be used for ρ(t), such as Tukey, Welsh and Fair, each of which yields different characteristics (see reference [8]).

An iterative solution is needed to solve the optimization problem defined by equation (4). The optimization of equation (4) is routinely implemented with a standard algorithm such as Newton-Raphson iteration. Generally, if the starting point for the initial estimates of the unknown parameters (x) is suitably accurate, then the solution quickly converges. The complexity of the optimization problem increases dramatically as the number of estimated parameters (n) increases, and as the number of measurements (m) increases. For many GNSS applications where the number of estimated parameters is large, the computational complexity of forming an M-estimation solution is prohibitive for real-time embedded applications.

Figure 6:
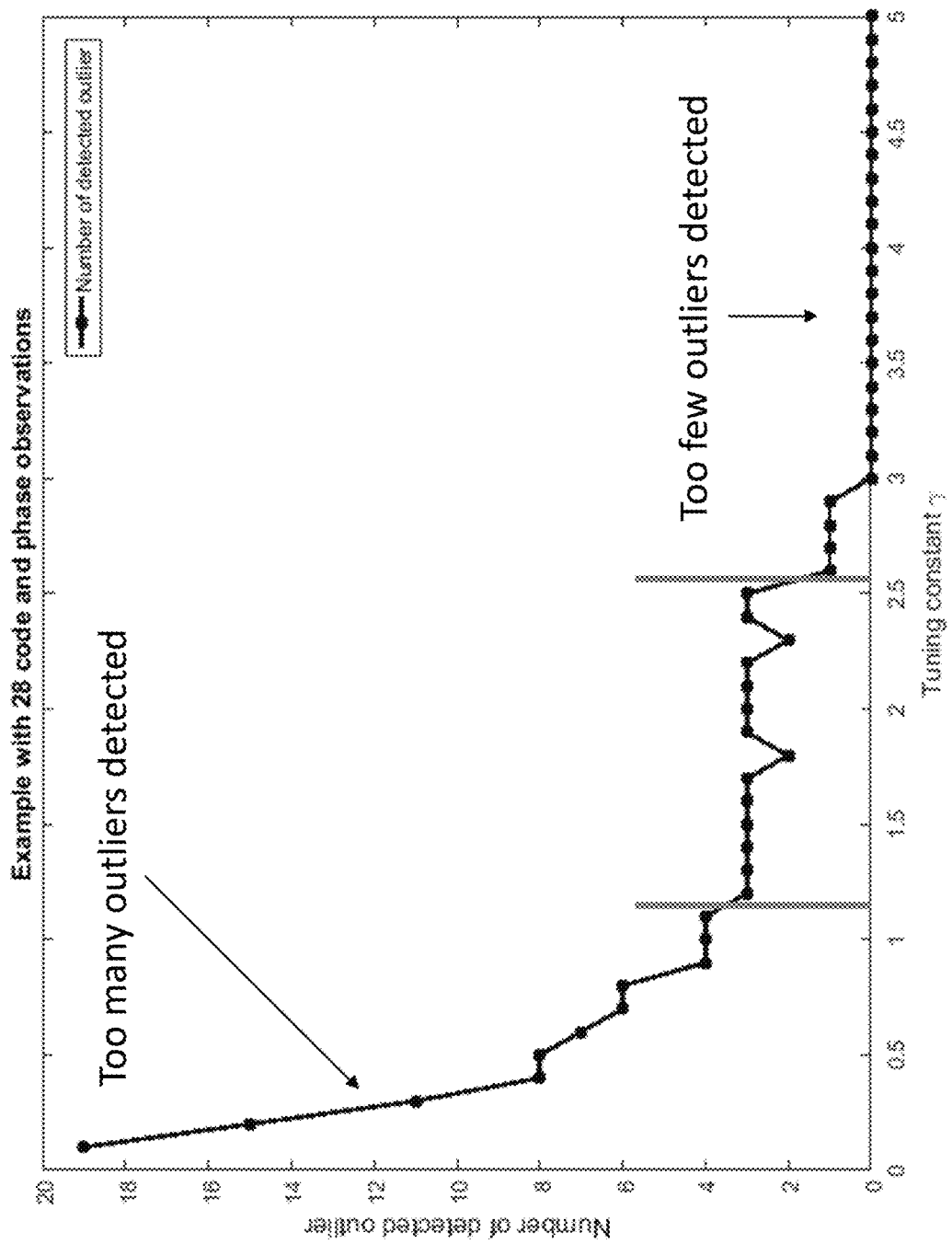
FIG. 6 shows how the number of detected outliers may depend on the value of a tuning constant when considering real-world observations, to illustrate the context in which some embodiments of the invention has been developed.

As mentioned above, tuning constant γ may for instance be set to a value in the interval [1.5σ, 2.5σ]. This range has been determined empirically using different sets of GNSS data. Reference [10], p. 88, suggests using instead a value in the range of 2.5 to 4.0. In any event, if the tuning constant is set too small, often many measurements would then be marked as outliers. This is illustrated by the example of FIG. 6 (see especially left-hand side of FIG. 6). If the tuning constant is set too large, some poor quality observations would then be potentially accepted as being "good" (see right-hand side of FIG. 6). In both cases, the performance of the robust estimation process would be degraded when setting the value too small or too high.

Let us now describe further embodiments of the invention.

In one embodiment, a GNSS positioning system is provided to generate accurate estimates of a receiver position in the presence of GNSS measurements that contain one or more outliers. The system may for example be an autonomous, differential, RTK, or precise point position (PPP) system. The system performs a position determination using one or more code, phase, or Doppler GNSS measurement types.

The system may for example be executed inside GNSS receiver hardware, but it may also be run in real-time on a separate computer device, or may be implemented within a post-mission data processing package.

Prior art high-precision GNSS positioning systems are typically based on least-squares estimation, or Kalman filtering. Both least squares estimation and Kalman filtering assume that measurement errors have a Gaussian distribution, i.e. the measurement errors are roughly zero mean and roughly follow a bell-shaped distribution, with most errors small, and large errors very infrequent. GNSS code and carrier phase measurements frequently include systematic errors and outliers. Often these errors are caused by signal obstruction and distortions resulting from foliage, solid structures, or multipath. Measurement outliers have an unbounded influence on the computed quantities of least squares estimators and Kalman filters. In other words, a single large measurement outlier may have a very significant impact on the computed position of the NSS receiver.

The above-referred system in accordance with an embodiment of the invention involves robust estimation technique(s) that can readily accommodate one or more measurement outliers and still produce position estimates with acceptable accuracy. In particular, the issues of computational complexity are addressed by limiting the number of estimated parameters in the robust estimator, i.e. robustifier 210, to a minimal set. Robustifier 210 is used in a pre-filtering step to trap measurement outliers and deweight and/or remove their influence on the main GNSS data processing elements.

This therefore enables GNSS positioning results to be provided in environments where GNSS signal tracking is poor and probability of measurement outliers is high. Therefore, the system may be applied to a broader range of target applications, such as, in particular, safety critical applications such as autonomous vehicles.

Figure 7:
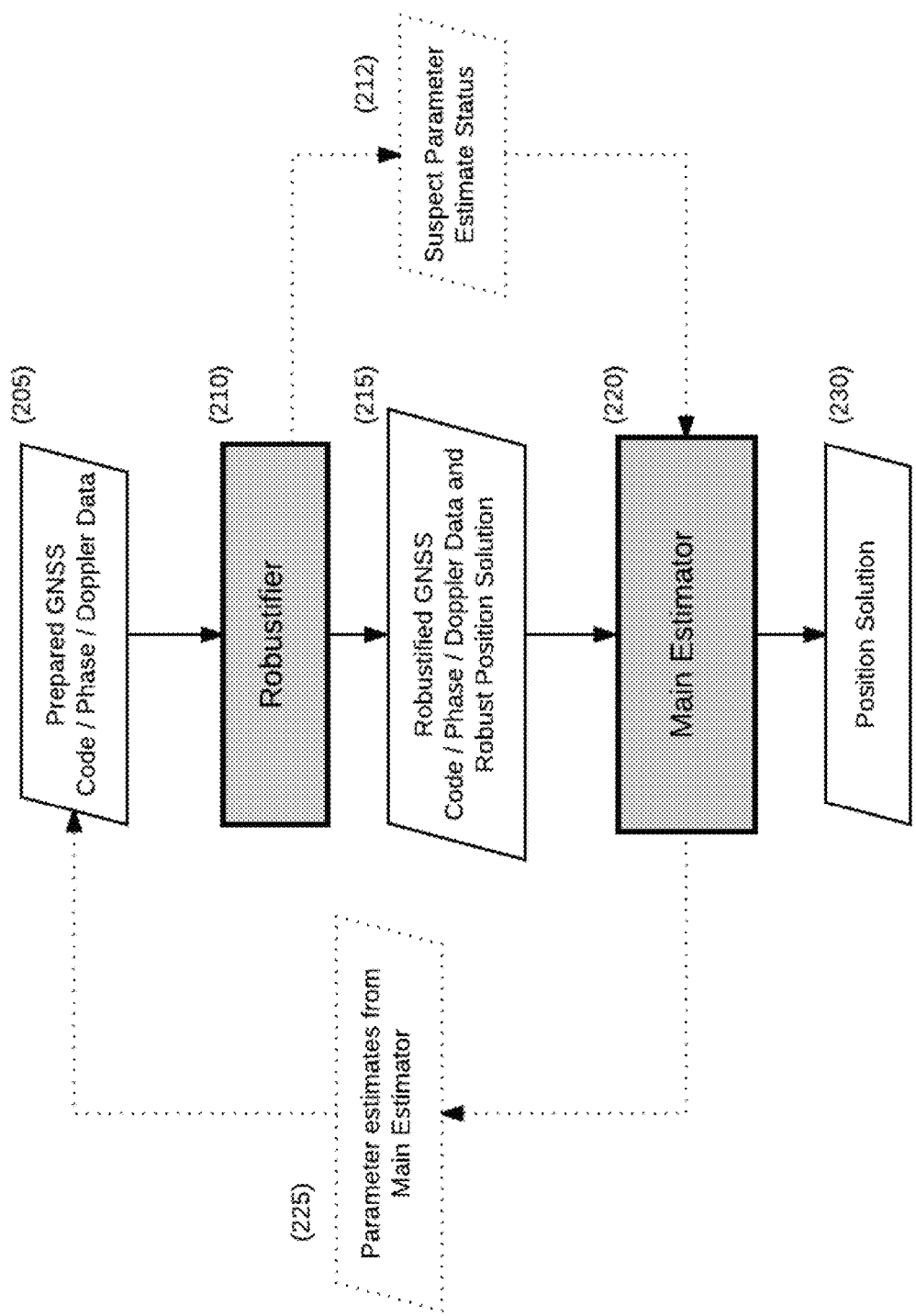
FIG. 7 schematically illustrates the data processing architecture of a system in one embodiment of the invention.

In other words, the system provides a practical scheme for adding robust estimations to GNSS positioning especially on devices with limited computational power. FIG. 7 schematically illustrates the architecture of such a system, in one embodiment of the invention. GNSS measurement data is supplied in the form of one or more of code, carrier-phase and/or Doppler measurements, collected from satellites in view, on one or more frequency bands. The measurements may be from a single rover receiver, or differential data corrected by a physical reference station, or differential data corrected by regional or global network of GNSS receivers.

GNSS code measurements provide estimates of the range (distance) between the rover antenna and each respective satellite. However, the code measurements are subject to a number of significant errors sources such as receiver clock bias, ionospheric and tropospheric signal delays. Atmospheric errors can be reduced via approximate models. Special linear combinations of multi-frequency GNSS data can be used to largely remove the ionospheric bias. The receiver clock bias is normally included as an estimated parameter in the rover position solution.

Carrier phase measurements are also subject to receiver clock errors and the same types of error sources as code measurements, with the addition of an integer carrier phase ambiguity term. Carrier phase measurements have millimeter-level precisions; however the integer carrier phase ambiguity term presents a large unknown bias in the receiver-satellite range. For high-precision applications, the integer carrier phase ambiguities are resolved and used to produce receiver-satellite range measurements with millimeter-level precision.

Doppler measurements provide instantaneous receiver-satellite velocity information and may be used to estimate the receiver velocity and clock drift.

Raw GNSS measurements are corrected for systematic errors and are assigned a priori noise models as part of element 205. In a conventional GNSS processing scheme, the corrected GNSS measurements are forwarded directly to a main estimator 220. The main estimator solves for the position parameters of interest, plus various nuisance parameters. The rigour of the nuisance parameter modelling is dictated by the accuracy requirement of the estimation system. The main estimator may for example be based on a Kalman filter, or a least-squares estimator. If one or more of the input GNSS measurements are corrupted by errors that significantly depart from their assumed a priori noise model, then the estimated parameters are likewise corrupted.

The output of the main estimator is position-related information of the NSS receiver for a given time 230. The position information may then be used for display purposes, or as input to a real-time position control system, etc.

Robustifier's 210 function is to cleanse the GNSS measurement data which is then sent to main estimator 220. To do so, robustifier 210 may do the following:
  (i) identifying measurements that do not match their a priori noise model;
  (ii) removing measurement outliers, outputting measurements with adjusted noise models for data that did not match the input a priori noise model (so as to reduce the influence of measurement outliers via deweighting), and/or correcting measurement outliers (215);

(iii) providing a position and/or velocity solution that is not corrupted by measurement outliers (215);

(iv) optionally identifying outliers in one or more state variable values from main estimator 220 (through feedback 225); and (v) optionally identifying incorrect state variable value(s) from main estimator 220 and providing error feedback 212 to main estimator 220.

The pre-processing steps provided by robustifier 210 mean that the outlier detection and management of main estimator 220 can be simplified and reduced.

Robustifier 210 estimates a minimal set of state parameters which enable measurement outliers to be identified. Robustifier 210 may for example use only the following state variables (referred to above as robustifier-designated state variables):

Position state variables (three state variables);
Receiver clock state variable(s) (one state variable per NSS, or one state variable for all NSS); and
Velocity state variables (three state variables) (optional).

The use of a minimal number of state variables in robustifier 210 means that it can operate with relatively low computational complexity. The limitation of this approach is that a reduction in the rigour of the state modelling scheme means an inherent loss of accuracy. However, the accuracy of the state models has been found to be generally sufficiently good to provide a high level of outlier detectability. For example, decimeter-level measurement outliers can be detected by robustifier 210 running in a differential GNSS mode, which is sufficient to support centimeter-level positioning in main estimator 220.

In one embodiment, apart from assessing the input GNSS measurement data for outliers, robustifier 210 validates one or more state variables from main estimator 220. This embodiment is best explained by way of an example. For high-precision GNSS positioning systems, carrier phase measurements are processed and the integer carrier phase ambiguity terms are estimated as part of the positioning algorithm. Typically, the carrier phase ambiguities are estimated for each satellite/frequency band, as floating-point numbers in the main estimator. After a period of convergence, the floating-point carrier phase ambiguities (referred to in the art as the float solution) are output at regular epochs (step 225). Each satellite carrier phase measurement in data 205 is then adjusted by the previous epoch float carrier phase ambiguity to produce carrier-phase range measurements. The carrier-phase range measurements are then used as input to robustifier 210. Errors in the carrier phase ambiguities which are significantly larger than their formal uncertainty (covariance) causes robustifier 210 to flag the respective measurement as suspect (step 212). A decision can then be made to either mark the measurement as bad and/or deweight it, or to flag the offending carrier phase ambiguity as bad and reset the state variable in main estimator 220.

High-precision GNSS data processing typically includes steps to exploit the integer nature of the carrier phase ambiguities. In FIG. 7, main estimator 220 may include integer ambiguity resolution steps. Integer ambiguity resolution is a statistical process which seeks to identify the correct integer ambiguities based on all feasible candidates. Ambiguity resolution includes a small but finite level of chance of selecting the wrong integer ambiguities, which leads to decimeter- or greater errors in the estimated NSS receiver position. It is therefore useful to be able to validate the integer carrier phase ambiguities via robustifier 210 in a similar manner as described above for floating point carrier phase ambiguities.

In one embodiment, state variables being potentially reset in main estimator 220 comprises carrier phase ambiguity state variables. If an integer carrier phase ambiguity is incorrectly resolved in main estimator 220, then main estimator 220, which uses the incorrect carrier phase ambiguity, will experience a corresponding bias in the carrier phase range measurement of n-cycles (where n is the integer cycle error). Robustifier 210 aims at catching errors in the integer carrier phase ambiguities.

In one embodiment, schematically illustrated by FIG. 8, a system 200 comprises, or consists in, a NSS receiver, a processing entity capable of receiving data from the NSS receiver, or both a NSS receiver and a processing entity capable of receiving data from the NSS receiver. System 200 is used for estimating parameters useful to determine a position. The NSS receiver is configured to observe a NSS signal from each of a plurality of NSS satellites over multiple epochs. System 200 is configured for receiving input data comprising: NSS signals observed by the NSS receiver, information derived from said NSS signals, or both. System 200 comprises and is configured to operate a robustifier (or robustifier unit) 210 and a main estimator (or main estimator unit) 220, as described above.

Any of the above-described methods and their embodiments may be implemented, at least partially, by means of a computer program. The computer program may be loaded on an apparatus, such as for example a NSS receiver (running on a rover station or a reference station) or a server (which may comprise one or a plurality of computers). Therefore, the invention also relates to a computer program, which, when carried out on an apparatus as described above, such as for example a NSS receiver (running on a rover station or a reference station) or a server, carries out any one of the above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods, systems and apparatuses.

NSS receivers may include an antenna, or may include multiple antennas to support attitude determination which may also benefit from the present invention, where said antennas are configured to receive the signals at the frequencies broadcasted by the satellites, processor units, one or more accurate clocks (such as crystal oscillators or atomic disciplined crystal oscillators), one or more central processing units (CPU), one or more memory units (RAM, ROM, flash memory, or the like), and a display for displaying position information to a user.

Where the terms "robustifier unit", "main estimator unit", and the like are used herein as units of a system (such as a NSS receiver), no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit.

The above-mentioned units may be implemented using hardware, software, a combination of hardware and software, pre-programmed ASICs (application-specific integrated circuit), etc. A unit may include a CPU, a storage unit, input/output (I/O) units, network connection devices, etc.

Although the present invention has been described on the basis of detailed examples, the detailed examples only serve to provide the skilled person with a better understanding, and are not intended to limit the scope of the invention. The scope of the invention is much rather defined by the appended claims.

Abbreviations:
ASICs application-specific integrated circuit
CPU central processing unit
GNSS global navigation satellite system
GPS Global Positioning System
IRNSS Indian Regional Navigational Satellite System
LMS least median squares
LTS least trimmed squares
NSS navigation satellite system
PPP precise point positioning
QZSS Quasi-Zenith Satellite System
RAM random-access memory
RNSS regional navigation satellite systems
ROM read-only memory
RTK real-time kinematic

REFERENCES

[1] Hofmann-Wellenhof B., et al., *GNSS, Global Navigation Satellite Systems, GPS, GLONASS, Galileo, & more*, Springer-Verlag Wien, 2008.
[2] Maronna, R. A. et al., *Robust Statistics, theory and methods*, John Wiley & Sons, 2006, Chichester, England. ISBN: 13 978-0-470-01092-1.
[3] Baarda, W., *Statistical Concepts in Geodesy*, Math. Geod. Comm. Publ. on Geodesy, new series, 1967, Vol. 2, No. 4, Delft.
[4] Mehra, R. K. & Peschon, J., *An Innovations Approach to Fault Detection and Diagnosis in Dynamic Systems*, Automatica, 1971, Vol. 16, pp. 637-640.
[5] Salzmann, M. & Teunissen, P. J. G., *Quality Control in Kinematic Data Processing*, Land Vehicle Navigation 1989, DCON, Verlag TÜV, Rheinland, Köln, pp. 355-366.
[6] Tukey, J. W., *A survey of sampling from contaminated distributions*, Contributions to Probability and Statistics, I. Olkin (ed.), Stanford, Calif., Stanford University Press, 1960.
[7] Huber, P. J., *Robust estimation of a location parameter*, 1964, The Annals of Mathematical Statistics, 35, pp. 73-101.
[8] Huber, P. J., *Robust Statistics*, John Wiley & Sons Inc., 1981, New York.
[9] Hampel, F. R., et al., 1986, *Robust Statistics: The Approach Based on Influence Functions*, John Wiley & Sons, Inc., New York.
[10] Wicki, F., Robuste Schätzverfahren für die Parameterschätzung in geodätischen Netzen. 1998, Mitteilungen Nr. 67, Institute of Geodesy and Photogrammetry, ETH Zürich, Switzerland.

The invention claimed is:

1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing a NSS signal from each of a plurality of NSS satellites over multiple epochs, the method comprising:
receiving input data comprising at least one of: NSS signals observed by the NSS receiver, and information derived from said NSS signals; and
operating a first filter, hereinafter referred to as "robustifier", and a second filter, hereinafter referred to as "main estimator", wherein:
each of the robustifier and main estimator uses state variables, and computes the values of their respective state variables at least based on the received input data;
the robustifier identifies, within the received input data, any measurement that does not match a stochastic model assigned thereto;
for each measurement identified by the robustifier as not matching its stochastic model, at least one of the following applies:
the robustifier rejects the measurement, and the main estimator does not use the rejected measurement;
the robustifier adjusts the stochastic model assigned to the measurement, and the main estimator uses the adjusted stochastic model; and
the robustifier corrects the measurement, and the main estimator uses the corrected measurement; and
the robustifier uses fewer state variables than the main estimator.

2. Method of claim 1, wherein the main estimator comprises at least one of a Kalman filter, and a least squares estimator.

3. Method of claim 1, wherein the robustifier comprises at least one of:
an M-estimator,
a BIBER estimator,
a least median squares (LMS) estimator,
a least trimmed squares (LTS) estimator,
an S-estimator, and
an L1 estimator.

4. Method according to claim 1, wherein the robustifier uses at least the following state variables:
three state variables representing at least one of:
the position of the NSS receiver,
an offset in the position of the NSS receiver relative to another position, and
a change in the position of the NSS receiver; and
a state variable representing at least one of:
a NSS common bias term for at least one NSS,
an offset in said NSS common bias term relative to another NSS common bias term, and
a change in a NSS common bias.

5. Method of claim 4, wherein the robustifier uses only:
said three state variables representing at least one of:
the position of the NSS receiver,
an offset in the position of the NSS receiver relative to another position, and
a change in the position of the NSS receiver; and
said state variable representing at least one of:
the NSS common bias term for at least one NSS,
an offset in said NSS common bias term relative to another NSS common bias term, and
a change in a NSS common bias.

6. Method according to claim 1, wherein
each of the multiple epochs over which the NSS receiver observes a NSS signal from each of a plurality of NSS satellites is hereinafter referred to as "receiver epoch", and,
at each receiver epoch, the robustifier
identifies, within the received input data, any measurement that does not match the stochastic model assigned thereto, and
for each measurement identified as not matching its stochastic model, performs at least one of the following operations:
rejecting the measurement,
adjusting the stochastic model assigned to the measurement, and
correcting the measurement.

7. Method according to claim 1, wherein the received input data is corrected for systematic errors before the robustifier uses said received input data.

8. Method according to claim 1, wherein measurements comprised in the received input data are assigned their stochastic model before the robustifier uses said received input data.

9. Method according to claim 1, wherein the robustifier further
receives, from the main estimator, values of state variables used by the main estimator;
identifies an error within the received values; and
provides feedback thereon to the main estimator.

10. System comprising at least one of a navigation satellite system receiver, hereinafter abbreviated as "NSS receiver", and a processing entity capable of receiving data from the NSS receiver, for estimating parameters useful to determine a position, the NSS receiver being configured to observe a NSS signal from each of a plurality of NSS satellites over multiple epochs,
the system being configured for receiving input data comprising at least one of: NSS signals observed by the NSS receiver, and information derived from said NSS signals; and
the system is configured to operate a first filter, hereinafter referred to as "robustifier", and a second filter, hereinafter referred to as "main estimator", wherein the robustifier and the main estimator are configured so that, in operation:
each of the robustifier and main estimator uses state variables, and computes the values of their respective state variables at least based on the received input data;
the robustifier identifies, within the received input data, any measurement that does not match a stochastic model assigned thereto;
for each measurement identified by the robustifier as not matching its stochastic model, at least one of the following applies:
the robustifier rejects the measurement, and the main estimator does not use the rejected measurement;
the robustifier adjusts the stochastic model assigned to the measurement, and the main estimator uses the adjusted stochastic model; and
the robustifier corrects the measurement, and the main estimator uses the corrected measurement; and
the robustifier uses fewer state variables than the main estimator.

11. System of claim 10, wherein the main estimator comprises at least one of a Kalman filter, and a least squares estimator.

12. System of claim 10, wherein the robustifier comprises at least one of:
an M-estimator,
a BIBER estimator,
a least median squares (LMS) estimator,
a least trimmed squares (LTS) estimator,
an S-estimator, and
an L1 estimator.

13. System according to claim 10, wherein the robustifier is configured so that, in operation, it uses at least the following state variables:
three state variables representing at least one of:
the position of the NSS receiver,
an offset in the position of the NSS receiver relative to another position, and
a change in the position of the NSS receiver; and
a state variable representing at least one of:
a NSS common bias term for at least one NSS,
an offset in said NSS common bias term relative to another NSS common bias term, and
a change in a NSS common bias.

14. System of claim 13, wherein the robustifier is configured so that, in operation, it uses only:
said three state variables representing at least one of:
the position of the NSS receiver,
an offset in the position of the NSS receiver relative to another position, and
a change in the position of the NSS receiver; and
said state variable representing at least one of:
the NSS common bias term for at least one NSS,
an offset in said NSS common bias term relative to another NSS common bias term, and
a change in a NSS common bias.

15. System according to claim 10, wherein
each of the multiple epochs over which the NSS receiver is configured to observe a NSS signal from each of a plurality of NSS satellites is hereinafter referred to as "receiver epoch", and,
the robustifier is configured so that, at each receiver epoch, it
identifies, within the received input data, any measurement that does not match the stochastic model assigned thereto, and
for each measurement identified as not matching its stochastic model, performs at least one of the following operations:
rejecting the measurement,
adjusting the stochastic model assigned to the measurement, and
correcting the measurement.

16. System according to claim 10, wherein the system is further configured so that, in operation, robustifier
receives, from the main estimator, values of state variables used by the main estimator;
identifies an error within the received values; and
provides feedback thereon to the main estimator.

17. Computer program or set of computer programs comprising computer-readable instructions configured, when executed on a computer or set of computers, to cause the computer or set of computers to carry out the method according to claim 1.

* * * * *